(12) United States Patent
Buur et al.

(10) Patent No.: US 8,112,194 B2
(45) Date of Patent: Feb. 7, 2012

(54) METHOD AND APPARATUS FOR MONITORING REGENERATIVE OPERATION IN A HYBRID POWERTRAIN SYSTEM

(75) Inventors: Hanne Buur, Brighton, MI (US); William R. Cawthorne, Milford, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 664 days.

(21) Appl. No.: 12/245,726

(22) Filed: Oct. 4, 2008

(65) Prior Publication Data

US 2009/0111640 A1    Apr. 30, 2009

Related U.S. Application Data (60) Provisional application No. 60/983,246, filed on Oct. 29, 2007.

(51) Int. Cl.
*G01M 17/00* (2006.01)
(52) U.S. Cl. ............................................ 701/29; 701/70
(58) Field of Classification Search .................. None
See application file for complete search history.

(56) References Cited

U.S. PATENT DOCUMENTS

| | | | |
|---|---|---|---|
| 6,832,148 B1 | 12/2004 | Bennett | |
| 6,868,318 B1 | 3/2005 | Cawthorne | |
| 7,154,236 B1 | 12/2006 | Heap | |
| 2005/0061561 A1* | 3/2005 | Leonardi et al. | 180/65.1 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1 | 11/2005 | Heap | |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |

(Continued)

FOREIGN PATENT DOCUMENTS

JP    2001-61203    *    3/2001

*Primary Examiner* — Michael J. Zanelli (57) ABSTRACT

A hybrid powertrain system includes an engine and a torque actuator coupled to a driveline to transfer tractive power to a wheel including a friction brake. A method includes monitoring an operator braking request and determining a request for regenerative braking torque. Operation of the torque actuator to react tractive power is inhibited when a fault is detected in the monitored request for regenerative braking torque and achieved regenerative braking torque.

20 Claims, 5 Drawing Sheets

U.S. PATENT DOCUMENTS

| | | |
|---|---|---|
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |

| | | |
|---|---|---|
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

* cited by examiner

METHOD AND APPARATUS FOR MONITORING REGENERATIVE OPERATION IN A HYBRID POWERTRAIN SYSTEM

CROSS REFERENCE TO RELATED APPLICATIONS

This application claims the benefit of U.S. Provisional Application No. 60/983,246, filed on Oct. 29, 2007 which is hereby incorporated herein by reference.

TECHNICAL FIELD

This disclosure is related to control systems for hybrid powertrain systems.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The machines may transform vehicle kinetic energy transmitted through the vehicle driveline to energy that is storable in an energy storage device. A control system monitors various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed.

SUMMARY

A powertrain system includes an engine and a torque actuator coupled to an output member, the output member coupled to a driveline to transfer tractive power to a wheel including a friction brake, the torque actuator operative to react tractive power transferred from the wheel. A method for controlling the powertrain system includes monitoring an operator braking request and determining a request for regenerative braking torque. The request for regenerative braking torque is monitored, and the torque actuator is commanded to react tractive power based upon the monitored request for regenerative braking torque. Achieved regenerative braking torque is monitored, and operation of the torque actuator is inhibited when a fault is detected in one of the monitored request for regenerative braking torque and the monitored achieved regenerative braking torque

BRIEF DESCRIPTION OF THE DRAWINGS

One or more embodiments will now be described, by way of example, with reference to the accompanying drawings, in which.

DETAILED DESCRIPTION

Figure 1:
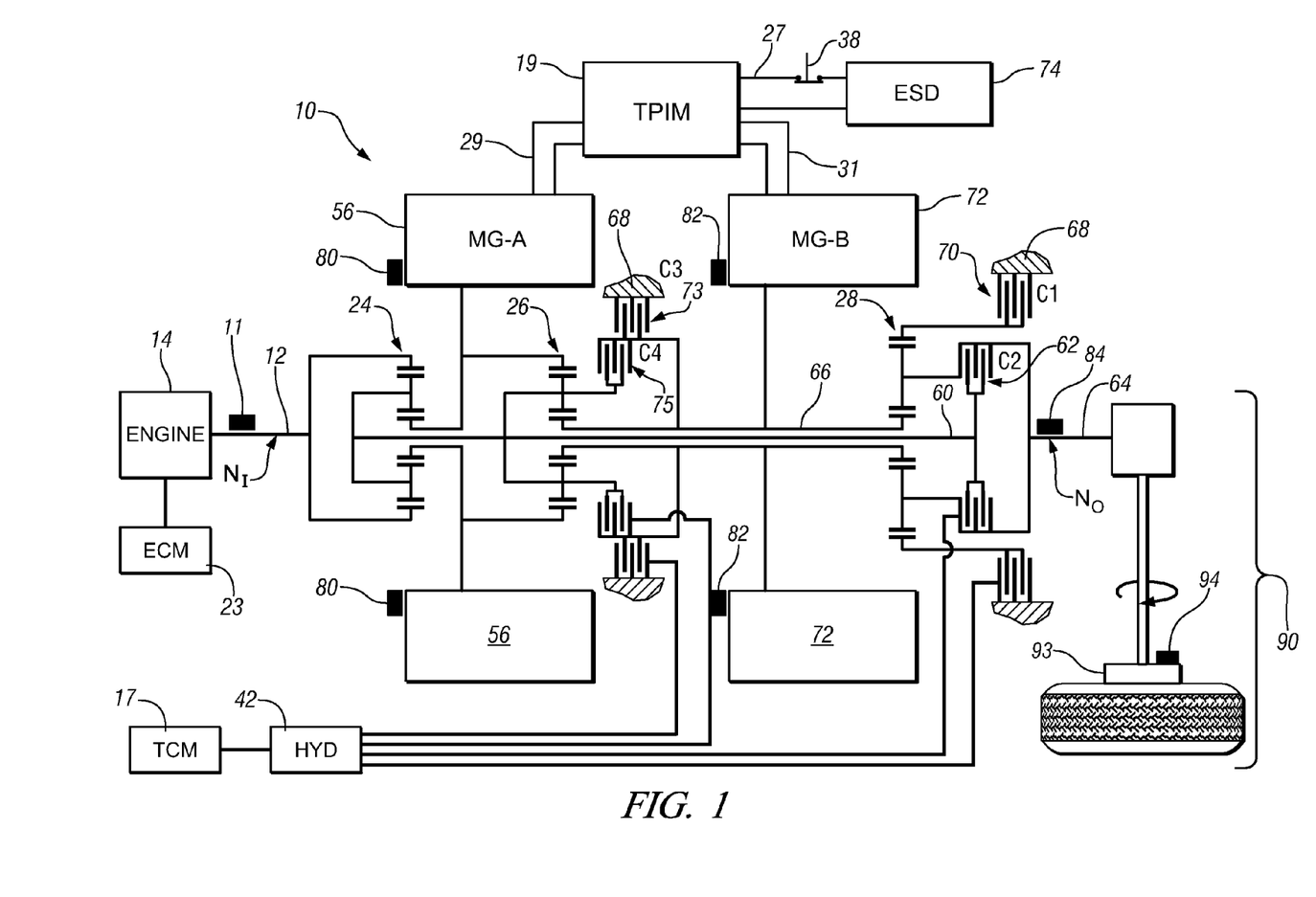
FIG. 1 is a schematic diagram of an exemplary hybrid powertrain, in accordance with the present disclosure.
Figures 2, 3:
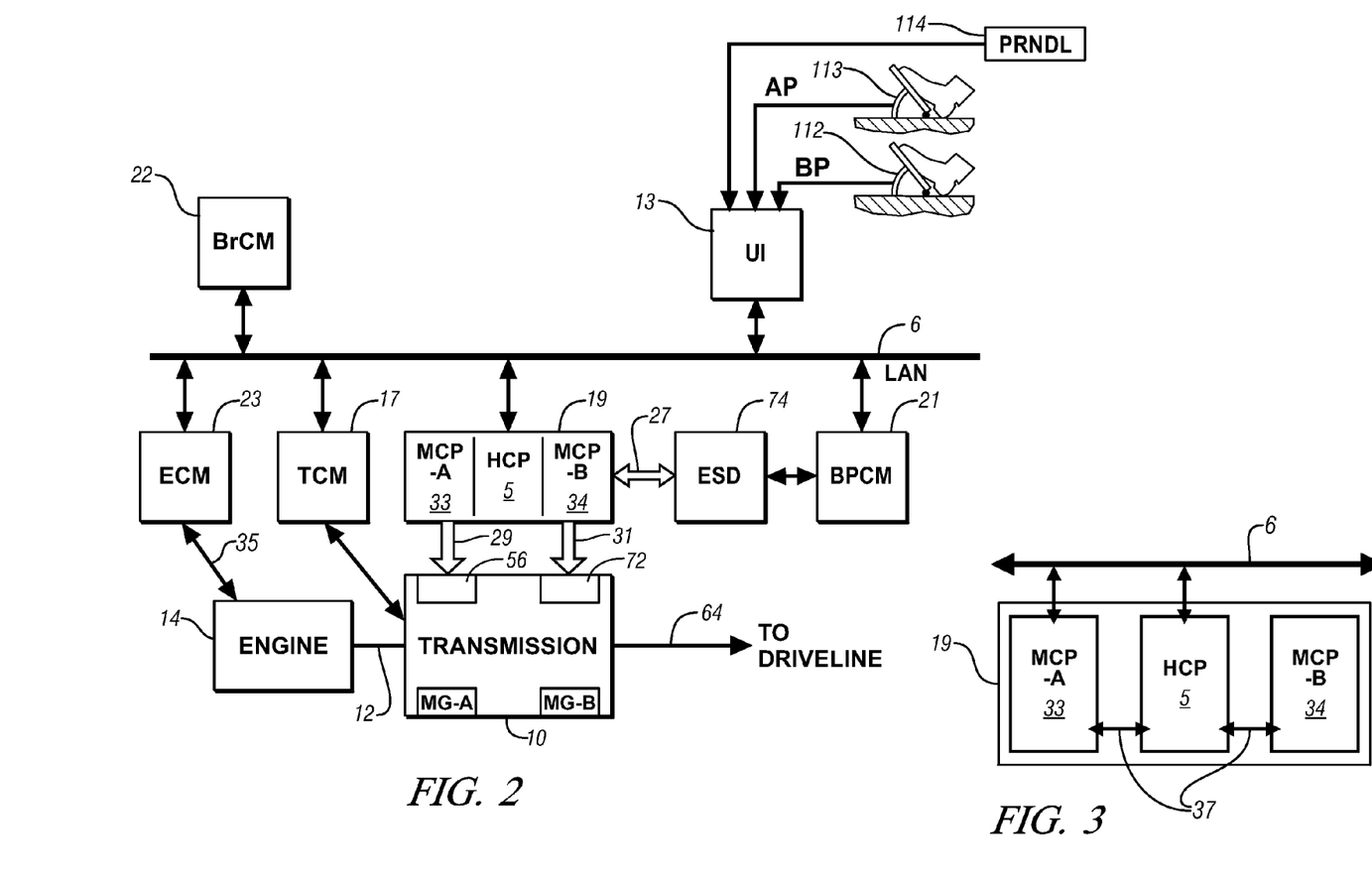
FIG. 2 is a schematic diagram of an exemplary architecture for a control system and hybrid powertrain, in accordance with the present disclosure.
FIGS. 3, 4, 5 and 6 are schematic signal flow diagrams of a control scheme, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain in accordance with the present disclosure is depicted in FIG. 1, comprising a two-mode, compound-split, electro-mechanical hybrid transmission 10 operatively connected to an engine 14 and torque machines comprising first and second electric machines ('MG-A') 56 and ('MG-B') 72. The engine 14 and first and second electric machines 56 and 72 each generate mechanical power which can be transferred to the transmission 10. The engine 14, transmission 10 and the torque machines comprising the first and second electric machines in this embodiment comprise torque actuators. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input member 12, and can be either a spark-ignition or a compression-ignition engine. The engine 14 includes a crankshaft (not shown) operatively coupled to the input member 12 of the transmission 10. A rotational speed sensor 11 monitors rotational speed of the input member 12. Power output from the engine 14, comprising rotational speed and engine torque, can differ from the input speed $N_I$ and the input torque $T_I$ to the transmission 10 due to placement of torque-consuming components on the input member 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit ('HYD') 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor (not shown) adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 through a first motor control module ('MCP-A') 33 using transfer conductors 29, and the TPIM 19 similarly transmits electrical power to and from the second electric machine 72 through a second motor control module ('MCP-B') 34 using transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 preferably includes a hybrid control module (hereafter 'HCP') 5 and the pair of power inverters and respective motor control modules 33 and 34 configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIGS. 2 and 3 are schematic block diagrams of the distributed control module system of the control system. As used herein, the term 'control system' is defined as the control modules, wiring harnesses (not shown), communications links, sensors and actuators that monitor and control operation of the powertrain system. The control system monitors sensor inputs and commands outputs for controlling the actuators. The distributed control module system comprises a subset of overall vehicle control architecture, and provides coordinated system control of the exemplary hybrid powertrain described in FIG. 1. The control system includes the distributed control module system for synthesizing information and inputs, and executing algorithms to control actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, a brake control module (hereafter 'BrCM') 22, and the TPIM 19. The HCP 5 provides supervisory control and coordination of the ECM 23, the TCM 17, the BPCM 21, the BrCM 22 and the TPIM 19. A user interface ('UI') 13 is preferably signally connected to a plurality of devices through which a vehicle operator controls, directs, and commands operation of the electro-mechanical hybrid powertrain. The devices include an accelerator pedal 113 ('AP'), an operator brake pedal 112 ('BP'), a transmission range selector 114 ('PRNDL'), and a vehicle speed cruise control (not shown). The transmission range selector 114 may have a discrete number of operator-selectable positions, including the rotational direction of the output member 64 to enable one of a forward and a reverse direction. The user interface 13 can comprise a single device, as shown, or alternatively can comprise a plurality of user interface devices directly connected to the individual control modules (not shown).

The aforementioned control modules communicate with other control modules, sensors, and actuators via a communications link comprising a local area network (hereafter 'LAN') bus 6, in this embodiment. The LAN bus 6 allows for structured communication between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communications between the MCP-A 33 and the HCP 5 and between the MCP-B 34 and the HCP 5 is preferably effected using direct links preferably comprising serial peripheral interface (hereafter 'SPI') buses 37. Communication between individual control modules can also be effected using a wireless link, e.g., a short range wireless radio communications bus (not shown).

The HCP 5 provides supervisory control of the hybrid powertrain, serving to coordinate operation of the ECM 23, TCM 17, MCP-A 33, MCP-B 34, BrCM 22 and BPCM 21. Based upon various command signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The HCP 5 sends commands to specific control modules to effect control of the engine 14, transmission 10 and the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input member 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates control signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates control signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

The BrCM 22 is operatively connected to the friction brakes 94 on each of the vehicle wheels 93. Braking preferably comprises a blending of friction braking and regenerative braking. The BrCM 22 monitors the operator input to the brake pedal 112 and determines a net operator input to the brake pedal 112 and the accelerator pedal 113. The BrCM 22 commands friction braking by applying the friction brakes 94 and commands operation of the powertrain system through the HCP 5 to create a negative output torque to react with the driveline 90. The electro-mechanical transmission 10 and the engine 14 can generate a negative output torque that reacts with the driveline 90. The negative output torque reacted through the electro-mechanical transmission 10 can be transferred to the first and second electric machines 56 and 72 to generate electric power for storage in the ESD 74. The regenerative braking is effected through the driveline 90 by selectively applying one of the clutches and controlling the first and second electric machines 56 and 72 to react torque transferred from the driveline 90 through the power inverters and respective motor control modules to meet the commanded motor torques $T_A$ and $T_B$ which are determined based upon the negative output torque. The applied braking force and the negative output torque can decelerate and stop the vehicle so long as they are sufficient to overcome vehicle kinetic power at the wheel(s) 93.

Each of the control modules ECM 23, TCM 17, HCP 5, MCP-A 33, MCP-B 34, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses 37. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |

TABLE 1-continued

| Description | Engine State | Transmission Operating Range State | Applied Clutches | |
|---|---|---|---|---|
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113, the brake pedal 112, and the transmission range selector 114, as captured by the user interface 13, the HCP 5 and one or more of the other control modules determine torque commands to control torque actuators to meet the operator torque request at the output member 64 for transference to the driveline 90. The torque actuators preferably include a plurality of torque generative devices, e.g., the engine 14 and the first and second electric machines 56 and 72 and a torque transferring device comprising the transmission 10 in this embodiment. Based upon operator commands from the user interface 13, the HCP 5 determines the operator torque request and an output torque command from the transmission 10 to the driveline 90 and actuator controls including an input torque from the engine 14, clutch torques for the torque-transfer clutches C1 70, C2 62, C3 73, C4 75 of the transmission 10 and the motor torque commands for the first and second electric machines 56 and 72 based upon operator commands from the user interface 13.

Torque security of the hybrid powertrain system can be achieved by executing integrity tests of the control system which include monitoring hardware integrity, monitoring integrity of algorithms and memory devices, securing and monitoring integrity of critical signals during communications within one of the control modules and communications between the control modules, monitoring processor integrity and executing remedial actions. Torque security in presence of an observed fault can include limiting a torque actuator command signal. This can include maximum and minimum limits on torque actuator command signals and maximum rates of change on torque actuator command signals. Specifically, motor torque commands $T_A$ and $T_B$ can be limited to maximum and minimum motor torques, and changes in the motor torque commands $T_A$ and $T_B$ can be limited to effect a maximum rate of change in the output torque, e.g., 0.2 g.

Critical signals are secured and monitored to achieve signal integrity by individually securing and monitoring the control modules and securing and monitoring the serial communications links between the control modules. Critical signals include: input signals from sensors affecting torque output. Signal integrity of a critical signal can be secured and monitored by redundantly storing the critical signal in dual memory locations within the originating control module, referred to as 'dual store'. Signal integrity can be secured and monitored by redundantly calculating critical signals comprising control parameters, e.g., motor torque commands $T_A$ and $T_B$, and rationalizing the primary value with the redundant value. Signal integrity can be secured and monitored by back-calculating a critical control command value and verifying that it matches the original request. Signal integrity can be secured and monitored by rationalizing an achieved input torque and motor torque value against the commanded input torque and motor torque value.

Monitoring integrity of a signal transmitted over a serial bus includes detecting missing data, e.g., detecting loss of a message frame and taking a short term mitigation action and informing the receiving control module that no new data is available. Detecting missing data also includes detecting long term loss of communications to one of the control modules and taking a remedial action.

The distributed control module system of the exemplary embodiment preferably includes each of the torque actuators controlled by a separate control module. This embodiment includes the ECM 23 that monitors sensors and control actuators of the engine 14, the TCM 17 that monitors sensors and control actuators of the transmission 10, the MCP-A 33 that monitors sensors and control actuators of the first electric machine 56, and the MCP-B 34 that monitors sensors and control actuators of the second electric machine 72. The HCP 5 monitors inputs from and commands operation of the ECM 23, TCM 17, MCP-A 33 and MCP-B 34. Each of the ECM 23, MCP-A 33, MCP-B 34 and TCM 17 is responsible for closed loop monitoring and self-security based on secured commands received from the HCP 5.

Figure 4:
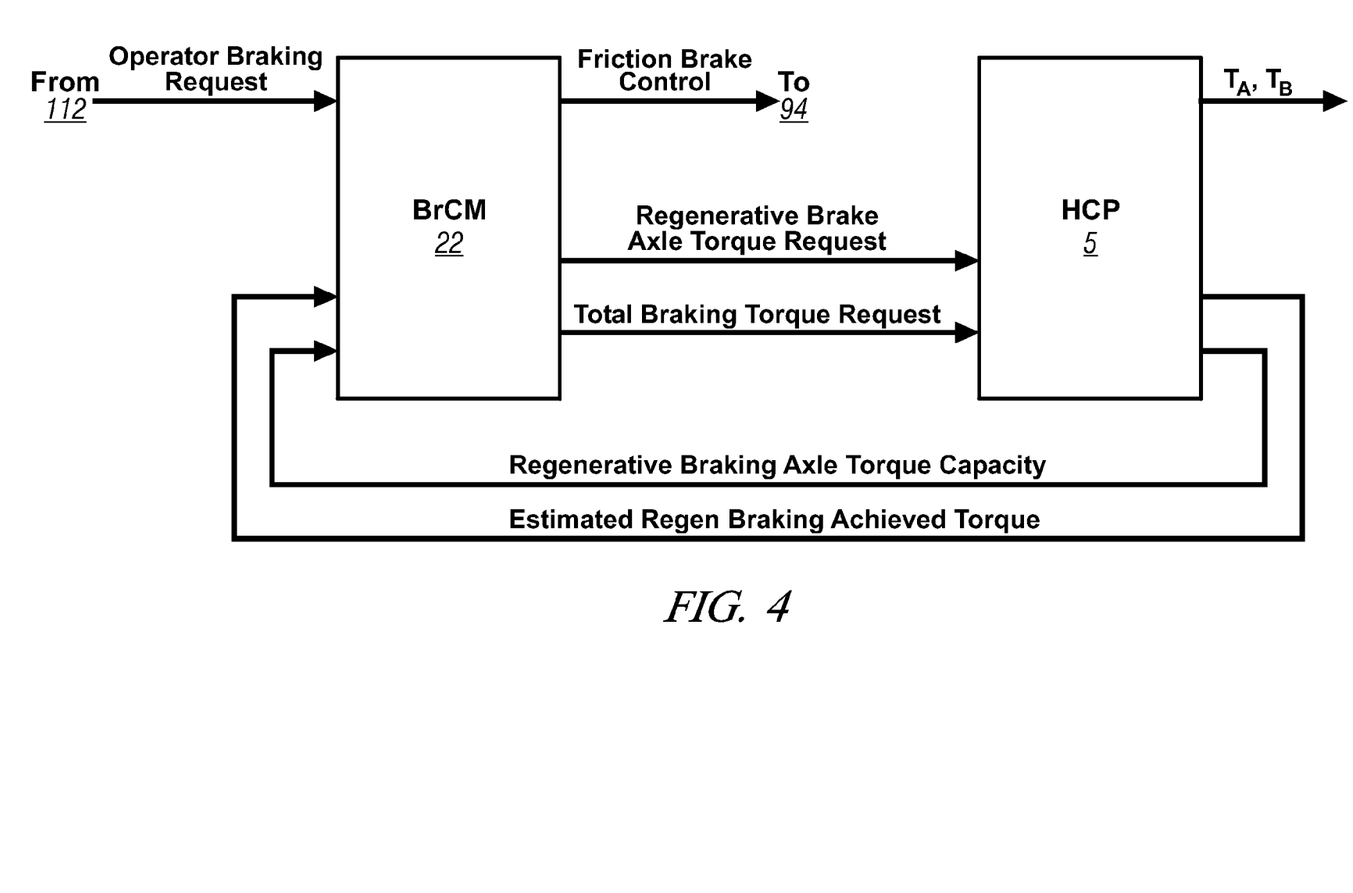

FIG. 4 shows a control system architecture for managing signal flow in the distributed control system to effect tractive braking through one or more of the vehicle wheels 93, an embodiment of which is described with reference to the hybrid powertrain described hereinabove. The operator braking request that is input to the brake pedal 112 ('Operator Braking Request') is preferably directly monitored by the BrCM 22 from which it determines a total braking torque request ('Total Braking Torque Request'). The BrCM 22 generates a regenerative braking axle torque request ('Regenerative Brake Axle Torque Request') based upon the total braking torque request and inputs from the HCP 5 comprising a regenerative braking axle torque capacity ('Regenerative Braking Axle Torque Capacity') and any presently applied regenerative braking torque ('Estimated Regen Braking Achieved Torque'). The BrCM 22 generates a control signal ('Friction Brake Control') comprising a command for friction braking torque to control the friction brake(s) 94 in each of the wheels 93 based upon a difference between the operator braking request and the regenerative braking torque that can be reacted through the transmission 14 by operation of the first and second electric machines 56 and 72 as estimated by the HCP 5. The BrCM 22 acts as a master arbitrator for controlling the friction brake(s) 94 and the transmission 10 to meet the operator braking request.

The HCP 5 determines the regenerative braking axle torque capacity, which is a torque-based measurement of the ability of the transmission 10 to react torque from the driveline 90 through the selectively applied clutches C1 70, C2 62, C3 73, and C4 75 to the first and second electric machines 56 and 72, limited by the maximum brake output torque. The immediate output torque request is determined based upon operator inputs to the accelerator pedal 113 and the brake pedal 112. The present output torque can be determined based on achieved motor torques, actual engine torque, output speed and output speed derivative from the transmission 10, engine input speed and transmission operating range state. The achieved motor torques are preferably based upon electric charging current flow between the first and second electric machines 56 and 72 and the ESD 74 for this embodiment.

The HCP 5 estimates the presently applied regenerative braking torque reacted from the driveline 90 and the output member 64 of the transmission 10 based upon a difference between the present output torque and an immediate output torque request. Preferably the HCP 5 redundantly calculates the presently applied regenerative braking torque. The redundantly calculated presently applied regenerative braking torque is compared to the primary presently applied regenerative braking torque in a rationality check, and when the absolute values of the signals match within a calibratable tolerance, the system is presumed to be working correctly. The primary presently applied regenerative braking torque signal is dual stored for communication. A preferred method for executing a rationality check is described hereinbelow with reference to FIG. 5.

The primary presently applied regenerative braking torque and the regenerative braking axle torque capacity are communicated over the LAN 6 to the BrCM 22. A preferred method for communicating a critical signal over the LAN 6 is described hereinbelow with reference to FIG. 6. The HCP 5 determines the preferred output torque from the powertrain and generates the motor torque commands ('$T_A$', '$T_B$') for controlling the first and second electric machines 56 and 72 based upon the regenerative braking axle torque request. The timing sequence of transmitting signals from the brake pedal 112 to the BrCM 22 and subsequently to the HCP 5 is intentional, as the most currently available operator input to the brake pedal 112 can be used to control vehicle braking during a braking event. The HCP 5 leverages recuperation of kinetic energy through the regenerative braking to generate storable electric power and improve operating efficiency. The regenerative braking axle torque request, the regenerative braking axle torque capacity, and the presently applied regenerative braking torque comprise critical signals that are preferably communicated between the HCP 5 and the BrCM 22 using the LAN 6.

When a fault is detected with the regenerative braking axle torque request signal communicated from the BrCM 22 to the HCP 5, the HCP 5 acts to inhibit regenerative braking by overwriting the communicated regenerative braking axle torque request and ramping it to a zero torque output. The HCP 5 ramps the regenerative braking axle torque capacity to a zero torque output and continues to report the presently applied regenerative braking torque, both which are communicated to the BrCM 22. The BrCM 22 is thus informed that there is no current capacity in the powertrain for regenerative braking, and the BrCM 22 controls the friction brake(s) 94 accordingly. Furthermore, the BrCM 22 ramps the regenerative braking axle torque request to zero, in response to the ramping of the regenerative braking axle torque capacity to zero torque output. The HCP 5 continues to communicate the presently applied regenerative braking torque to the BrCM 22. The BrCM 22 preferably ramps the regenerative braking axle torque request to zero at a calibrated ramp rate based upon the presently applied regenerative braking torque to minimize driveline torque disturbance.

In the event of a detected fault, the control system continues to operate the powertrain and inhibits the regenerative braking function. The BrCM 22 controls the friction brake(s) 94 to achieve braking torque in response to the operator braking request. System operation is continually monitored. A detected fault can be cleared, e.g., by determining the source of the fault is no longer present. When the detected fault is cleared, the regenerative braking function can be resumed. This includes the BrCM 22 preferably ramping in the regenerative braking axle torque request at a predetermined rate based upon the operator braking request. Coincidentally, the regenerative braking axle torque capacity is immediately returned to the determined value for regenerative braking axle torque capacity. The presently applied regenerative braking torque can be recalculated, as previously described and communicated.

Figure 5:
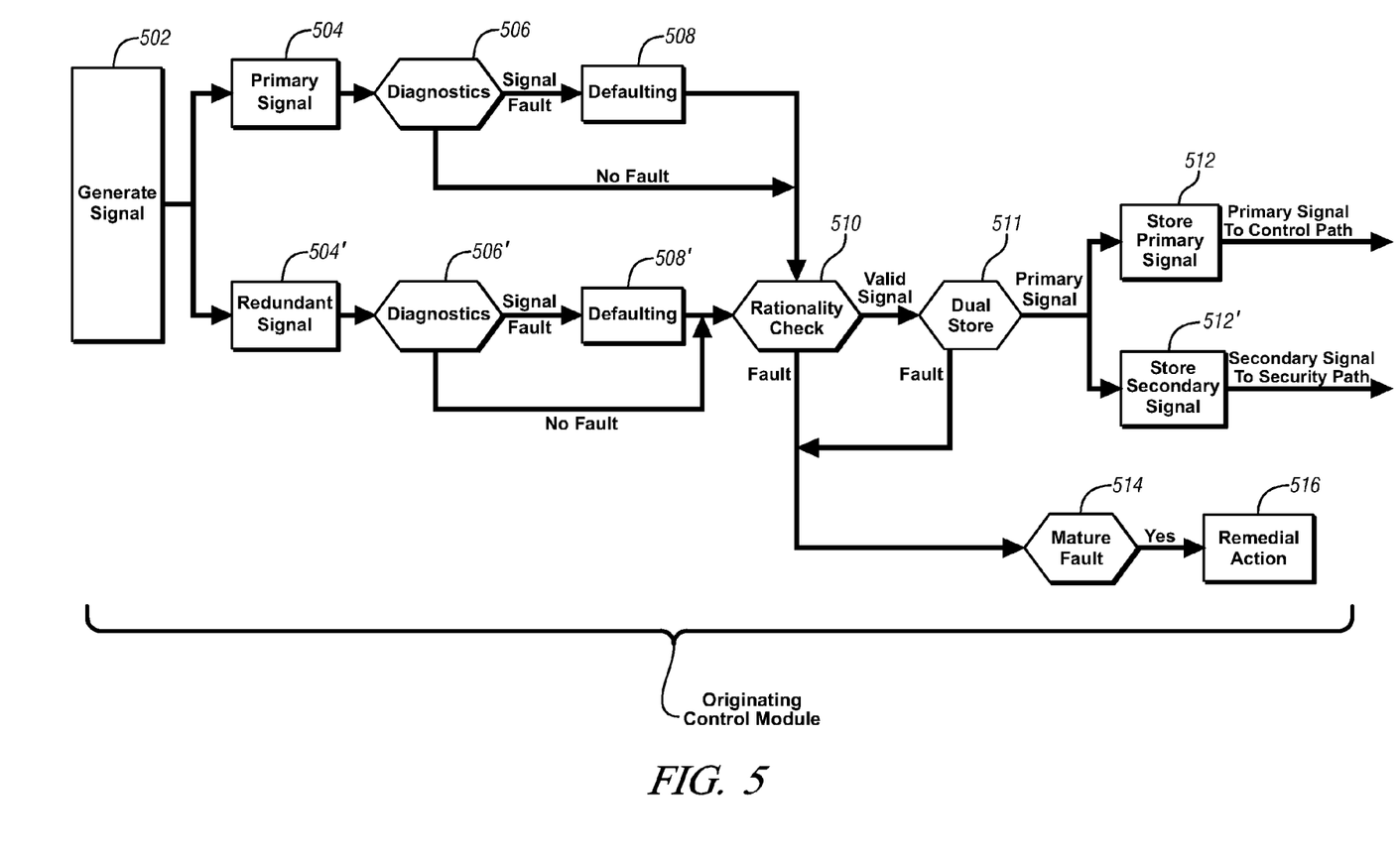

FIG. 5 shows signal flow to secure and verify integrity of an input signal in a control module. The signal input in this embodiment can comprise one of the operator braking request, the regenerative braking axle torque request, the regenerative braking axle torque capacity, and the presently applied regenerative braking torque, each which is described with reference to FIG. 4. The input signal is generated (502) and is captured as a primary signal 504 and a redundant signal 504'. This can include the input signal from the sensor converted to a digital representation of the input from the sensor using an analog-to-digital converter (not shown) which may be interposed between the sensor and the originating control module. Diagnostics ('Diagnostics') are executed on both the primary signal and the redundant signal (506, 506'). Diagnostics can include limit checks that indicate when the signal is outside of a predetermined operating range for the signal, a rationality check of the signal, and other diagnostics check that can indicate corruption of the signal. If a corrupted signal is detected ('Signal Fault') in either or both the primary signal and the redundant signal, a default signal is generated ('Defaulting') (508, 508') and communicated to a rationality check 510. The default signal preferably comprises a predetermined signal that is recognizable in the control module as indicating the primary signal or the redundant signal has been corrupted. When a fault is not detected ('No Fault'), the primary and/or the redundant signals are communicated to the rationality check 510. The rationality check 510 compares the primary signal and the redundant signal and identifies a fault ('Fault') when there is a difference detected between the primary and redundant signals. When the rationality check 510 indicates that the primary signal is valid ('Valid Signal'), the primary signal is communicated to a dual store function ('Dual Store') 511. The dual store function 511 monitors and compares present contents in first and second memory locations 512, 512' to verify integrity of the memory locations, preferably during each 6.25 ms loop cycle. When the dual store function 511 verifies integrity of the first and second memory locations, i.e., the present contents in the first and second memory locations are identical, the primary signal is stored as the primary signal in the first memory location ('Store Primary Signal') (512) and stored as a secondary signal in the second memory location ('Store Secondary Signal') (512'). The primary signal stored in the first memory location is subsequently communicated to a control path ('Primary Signal To Control Path'). The secondary signal stored in the second memory location is subsequently communicated to a security path. ('Secondary Signal To Security Path'). If there is a difference between the present contents of the memory locations, a fault ('Fault') is recorded indicating corruption of one of the first and second memory locations.

When the rationality check 510 indicates corruption of one or both of the primary and the redundant signals, or the dual store function 511 indicates corruption of the present contents of one the first and second memory locations 512, 512' the control system identifies occurrence of the fault ('Fault'). The control system determines whether the corrupted signal has matured ('Mature Fault') (514), and executes remedial action (516) to mitigate risks associated with the presence of the fault. A fault maturation algorithm can be executed, including, e.g., an X of Y routine wherein a fault has matured when X mismatched signals are observed out of immediately preceding Y signal observations. An example includes determining a fault has matured when more than half the immediately preceding observations indicate a corrupted signal.

Monitoring integrity of a signal transmitted over a serial bus includes detecting missing data, e.g., detecting loss of a message frame and taking a short term mitigation action and informing the receiving control module that no new data is available. Detecting missing data also includes detecting long term loss of communications to one of the control modules and taking a remedial action.

Figure 6:
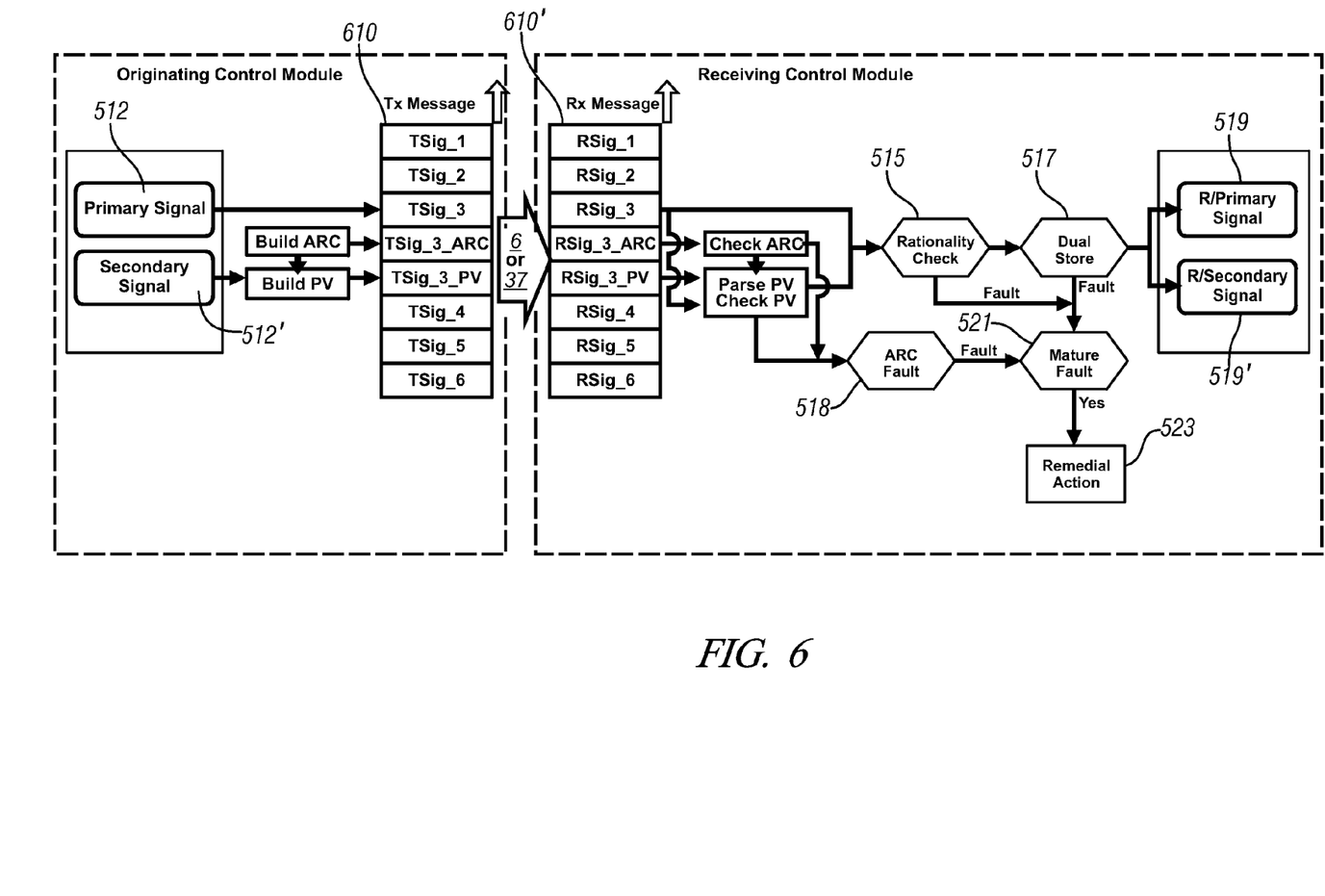

FIG. 6 shows communicating the redundantly stored signals, e.g., the dual stored signal from FIG. 5, from the originating control module to the receiving control module using a communications bus, e.g., LAN bus 6 or SPI bus 37. The originating control module generates a message ('Tx Message') 610 to transmit. In the embodiment shown, the transmitted message 610 includes words comprising other signals ('TSig_1' and 'TSig_2', 'TSig_4', 'TSig_5' and 'TSig_6'). The primary signal being secured is preferably inserted as a third word ('TSig_3'). The subsequent word ('TSig_3_ARC') comprises an alive rolling count ('Build ARC') consisting of a two bit digital word (one of 00, 01, 10, 11) wherein the two bit word sequentially increments from 00 to 01 to 10 to 11 and repetitively cycles back to begin at 00 for consecutively generated and transmitted messages. The control module generates a fifth word ('TSig_3_PV') which preferably includes adding the alive rolling count to the primary signal and generating a protection value ('Build PV'). Generating the protection value preferably comprises generating a logic complement, e.g., a 2's complement, of the primary signal with the added alive rolling count.

The message 610 is transmitted over one of the serial communications links 6, 37 and received at the receiving control module as a received message ('Rx Message') 610'. The received message 610' is decoded, including determining received words ('RSig_1', 'RSig_2', 'RSig_3', 'RSig_3_ARC', 'RSig_3_PV', 'RSig_4', 'RSig_5' and 'RSig_6'). The third word ('RSig_3') is captured and will be stored in a predetermined memory location as a received primary signal ('R/Primary Signal') subsequent to a successful rationality check 515 and a successful dual-store function 517 of memory locations 519 and 519'. The fourth word ('RSig_3_ARC') is captured and interpreted as a received alive rolling count. The received alive rolling count is compared to an expected alive rolling count, i.e., the next two bit word in the sequence from 00 to 01 to 10 to 11 ('ARC Fault') (518). A fault is recorded if the received alive rolling count is not equal to an expected alive rolling count (518). The fifth word ('RSig_3_PV') is captured and a received secondary signal ('R/Secondary Signal') is determined by generating a corresponding inverse logic complement of the fifth word and parsing out the alive rolling count ('Parse PV/Check PV'). Preferably the alive rolling count from the fourth word is subtracted therefrom.

The rationality check 515 compares the received primary signal and the received secondary signal and identifies a fault ('Fault') when a difference is detected, preferably prior to storing the received primary signal. When the rationality check 515 indicates that the signal is valid, the primary signal is communicated to the dual store function ('Dual Store') 517. The dual store function 517 monitors and compares present contents in first memory location 519 and second memory location 519' to verify integrity of the memory locations, preferably during each 6.25 ms loop cycle. When the dual store function 517 compares and determines the contents of the first and second memory locations 519 and 519' are identical, the received primary signal is dual-stored, i.e., the received primary signal ('R/Primary Signal') is stored in both the first and second memory locations 519 and 519'. If there is a difference between the present contents of the first and second memory locations 519 and 519', a fault ('Fault') is recorded indicating corruption of one of the first and second memory locations 519 and 519' and remedial action is undertaken consistent with the specific signal.

When a fault is recorded based upon the received alive rolling count not being equal to the expected alive rolling count (518), or the rationality check 515 indicates corruption of one or both of the primary and the redundant signals, or the dual store function 517 indicates corruption of the present contents of one the first and second memory locations, the control system identifies occurrence of the fault ('Fault'). The control system determines whether the corrupted signal has matured to a fault using a fault maturation algorithm ('Mature Fault') (521), and executes remedial action (523) to mitigate risks associated with the presence of the fault. The fault maturation algorithm can be executed to determine whether the corrupted signal has matured, including, e.g., an X of Y routine wherein a fault has matured when X mismatched signals are observed out of immediately preceding Y signal observations. An example includes determining a fault has matured when more than half the immediately preceding observations indicate a corrupted signal. As shown, there is a common fault maturation algorithm 521 for the alive rolling count comparison 518, the rationality check 515 and the dual store function 517. Alternatively, there can be individually executed fault maturation algorithms.

Messages are transmitted at a rate dependent upon the communications rate of the specific bus, e.g., the LAN bus 6 or SPI bus 37, which can be 1 Mbps. In one embodiment, messages are communicated across the LAN bus 6 every 6.25 ms loop cycle. Messages can be sent serially and evaluated. The aforementioned signal monitoring software can execute a detection algorithm in one of the loop cycles to detect signal inconsistency between the primary signal and the secondary signal. When an inconsistency is detected, it is recorded as a mismatch count in a fault maturation algorithm, e.g., an X of Y routine wherein a fault is detected when X mismatched signals are observed out of immediately preceding Y signal observations. The control system can execute remedial action to mitigate risks associated with the presence of a fault identified by the fault maturation algorithm. An X of Y routine in which Y=16 and in which messages are communicated across the LAN bus 6 every 6.25 ms loop cycle is able to detect and mature a fault within 100 milliseconds.

Detection of a fault in communications can include detecting temporary loss of data and missing data, detecting corrupted data, and no data. Detecting missing data includes detecting loss of a message frame and taking a short term mitigation action and informing the receiving control module that no new data is available. Detecting no data includes detecting a long term loss of communications to one of the control modules and taking a remedial action. When missing data is detected during communications, the control module can enter a fail-soft mode, wherein torque commands are initially held unchanged, i.e., at steady-state torque levels for a predetermined period of time and then ramped down toward zero torque command. The control modules continue to communicate, and when valid communications are reestablished, torque commands can be ramped up to achieve the operator torque request, with rate-change of the output torque controlled to effect the previously described maximum rate of change in output torque, e.g., 0.2 g. When loss of communications is permanent, powertrain operation can be transitioned to a degraded state that limits output torque to a predetermined maximum level, preferably permitting some level of operation for a remainder of the key cycle.

When a fault is detected in the dual store functions 511, 517, the remedial action and fault mitigation can include disabling the actuator controlled by the respective control module in which the fault occurred. The remedial action can be actuator-specific or system-wide, and places the powertrain in a torque-safe state. The remedial action further includes storing an OBD compliant code for subsequent retrieval. A diagnostic may preliminarily identify a fault pending, meaning data corruption or an inconsistency has been detected but the fault maturation algorithm has not reached its threshold. The hardware integrity can be further determined using diagnostics software that monitors the sensors and actuators of the control system.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a powertrain system including an engine and a torque actuator coupled to an output member, the output member coupled to a driveline to transfer tractive power to a wheel including a friction brake, the torque actuator operative to react tractive power transferred from the wheel, the method comprising:
    monitoring an operator braking request and determining a request for regenerative braking torque;
    monitoring the request for regenerative braking torque;
    commanding the torque actuator to react tractive power based upon the monitored request for regenerative braking torque;
    monitoring achieved regenerative braking torque; and
    inhibiting operation of the torque actuator when a fault is detected in one of the monitored request for regenerative braking torque and the monitored achieved regenerative braking torque.

2. The method of claim 1, comprising monitoring communications and inhibiting operation of the torque actuator when a communications fault is detected, wherein said communications include the request for regenerative braking torque and the achieved regenerative braking torque.

3. The method of claim 2, further comprising ramping down the request for regenerative braking torque to a zero value to inhibit operation of the torque actuator.

4. The method of claim 3, further comprising setting a regenerative braking capacity to a zero value to inhibit operation of the torque actuator.

5. The method of claim 4, further comprising:
    subsequently determining the fault in one of the monitored request for regenerative braking torque and the monitored achieved regenerative braking torque is inactive, and thereafter setting the regenerative braking capacity to a regenerative braking capacity corresponding to an ability of the torque actuator to react tractive power transferred from the wheel; and
    ramping in the request for regenerative braking torque.

6. The method of claim 1, further comprising executing a rationality check of the monitored achieved regenerative braking torque and ramping down the achieved regenerative braking torque when a fault is detected in the monitored achieved regenerative braking torque.

7. The method of claim 1, further comprising:
    establishing a distributed control module system comprising a first control module operatively connected to the friction brake, a second control module operatively connected to the torque actuator, and a hybrid control module operative to command operation of the first and second control modules;
    establishing a serial communications link to transmit signals between the first control module and the hybrid control module;
    determining the operator braking request and generating signals comprising the request for regenerative braking torque and a friction braking torque command in the first control module;
    monitoring the signal comprising the request for regenerative braking torque in the first control module;
    generating and verifying a signal comprising the achieved regenerative braking torque in the hybrid control module;
    transmitting the signal comprising the request for regenerative braking torque from the first control module to the hybrid control module and verifying the transmitted signal in the hybrid control module; and
    transmitting the signal comprising the achieved regenerative braking torque from the hybrid control module to the first control module and verifying the transmitted signal in the first control module.

8. The method of claim 7, wherein verifying the signal comprises redundantly storing the signal at first and second memory locations in a memory device of the one of the hybrid control module and the first control module and comparing signals at the first and second memory locations prior to redundantly storing the signals.

9. Method for controlling a powertrain system including an engine, a transmission and a plurality of torque actuators connected to an energy storage device, the transmission operative to transfer power between the engine and the torque actuators and an output member, the output member coupled to a driveline to transfer tractive power to a wheel including a friction brake, one of the torque actuators operative to react tractive power transferred from the wheel to the driveline to the transmission, the method comprising:
    monitoring an operator braking request;
    determining a request for regenerative braking torque;
    monitoring the request for regenerative braking torque;

commanding the torque actuator to react tractive power based upon the monitored request for regenerative braking torque;

monitoring achieved regenerative braking torque; and inhibiting operation of the torque actuator when a fault is detected in one of the monitored request for regenerative braking torque and the monitored achieved regenerative braking torque.

10. The method of claim 9, further comprising controlling the friction brake based upon the operator braking request and the monitored achieved regenerative braking torque.

11. The method of claim 9, comprising monitoring communications and inhibiting operation of the torque actuator when a communications fault is detected, wherein said communications include the request for regenerative braking torque and the achieved regenerative braking torque.

12. The method of claim 9, comprising ramping down the request for regenerative braking torque to a zero value to inhibit operation of the torque actuator.

13. The method of claim 9, comprising setting a regenerative braking capacity to a zero value to inhibit operation of the torque actuator.

14. The method of claim 9, further comprising:

subsequently determining the fault in one of the monitored request for regenerative braking torque and the monitored achieved regenerative braking torque is inactive, and thereafter setting a regenerative braking capacity to a regenerative braking capacity corresponding to an ability of the torque actuators to react tractive power transferred from the wheel; and ramping in the request for regenerative braking torque.

15. Method for controlling a powertrain system including a torque actuator operative to transfer tractive power to a wheel including a friction brake and operative to react tractive power transferred from the wheel, the method comprising:

monitoring an operator braking request and determining a request for regenerative braking torque;

monitoring the request for regenerative braking torque;

commanding the torque actuator to react the tractive power transferred from the wheel based upon the request for regenerative braking torque;

monitoring achieved regenerative braking torque; and inhibiting operation of the torque actuator when a fault is detected in one of the request for regenerative braking torque and the achieved regenerative braking torque.

16. The method of claim 15, comprising monitoring communications and inhibiting operation of the torque actuator when a communications fault is detected, wherein said communications include the request for regenerative braking torque and the achieved regenerative braking torque.

17. The method of claim 16, further comprising ramping down the request for regenerative braking torque to a zero value to inhibit operation of the torque actuator.

18. The method of claim 17, further comprising setting a regenerative braking capacity to a zero value to inhibit operation of the torque actuator.

19. The method of claim 18, further comprising:

subsequently determining the fault in one of the monitored request for the regenerative braking torque and the monitored achieved regenerative braking torque is inactive, and thereafter setting the regenerative braking capacity to a regenerative braking capacity corresponding to an ability of the torque actuator to react tractive power transferred from the wheel; and ramping in the request for regenerative braking torque.

20. The method of claim 19, further comprising executing a rationality check of the monitored achieved regenerative braking torque, and ramping down the achieved regenerative braking torque when a fault is detected in the monitored achieved regenerative braking torque.

* * * * *